United States Patent Office 3,383,317
Patented May 14, 1968

3,383,317
ANTI-FREEZING ADDITIVES
Charles H. Jacoby, Grosse Ile, and Frank V. Whelply, Dearborn, Mich., assignors to International Salt Company, Clarks Summit, Pa.
No Drawing. Continuation-in-part of application Ser. No. 345,859, Feb. 19, 1964. This application June 23, 1965, Ser. No. 466,409
5 Claims. (Cl. 252—70)

This application is a continuation-in-part of our co-pending application Ser. No. 345,859, filed Feb. 19, 1964, now abandoned.

This invention relates to means for protecting bulk particulate material from freezing and/or caking and, especially, this invention relates to such protection for bulk particulate sodium chloride.

Particulate sodium chloride or salt is subject to solidification from two separate and independent phenomena, caking and freezing. In caking, solidification may occur at any temperature and results from variations in moisture content of the particulate sodium chloride as effected by atmospheric conditions. Thus, a salt pile exposed to rainfall and subsequent drying will exhibit caking. Likewise, a salt pile exposed to fluctuations of humidity, but otherwise protected as for example, from rainfall, will also exhibit caking, albeit at a slower rate. Therefore, caking is a phenomenon resulting from alternate wetting and drying of particulate sodium chloride irrespective of temperature conditions. Freezing, on the other hand, is not necessarily accompanied by variations in moisture content of the salt but is, instead, a phenomenon associated with temperature in the presence of some moisture content which, incidentally, may be relatively low (i.e., 1–2%).

The additives according to this invention are formulations of an anionic surfactant and calcium chloride; an anionic surfactant and a water soluble complex iron cyanide; or an anionic surfactant, calcium chloride and a water soluble complex iron cyanide, and when mixed in certain proportions herein specified and applied in a minor amount in uniform admixture with bulk particulate sodium chloride are effective to inhibit both caking and freezing of the bulk particulate sodium chloride.

The mechanism by which the additives of this invention act to obtain their effects is not clear. Anionic surfactants are not known to inhibit freezing of bulk particulate sodium chloride and, indeed, we have found that no measurable effect in this direction is achieved. Likewise, anionic surfactants are not known to inhibit caking of bulk particulate sodium chloride and we have likewise found no measurable effect in this direction. The use of water soluble complex iron cyanides as an anti-caking additive for bulk particulate sodium chloride is well known (Patent #3,036,884), but this additive has limited practical effect on the freezing tendency of bulk particulate sodium chloride. In this regard, it should be noted that the use of a water soluble complex iron cyanide alone will lower the freezing temperature of a salt pile somewhat, but that such protection will not extend to temperatures lower than about 20° F. Calcium chloride may be added in small amounts (i.e., 5–10 pounds per ton) to bulk particulate sodium chloride to inhibit caking, but the addition of larger amounts of calcium chloride will actually increase the tendency toward caking; and calcium chloride is thus known only to inhibit caking to the extent that it is successful in "drying" the sodium chloride salt due to the hygroscopic nature of calcium chloride. Insofar as freezing protection is concerned, calcium chloride may be used for this purpose in amounts of 20 pounds per ton of salt or more. Thus, for the separate phenomena of caking and freezing, the following observations may be made:

Anti-caking

Anionic surfactants ____ No known effects.
Calcium chloride _____ 5–10 pounds per ton of salt effective.
Water soluble complex iron cyanide _____ Amounts greater than about .087 pound of ferrocyanide ion per ton of salt effective.

Anti-freezing

Anionic surfactants ____ No known effects.
Calcium chloride _____ 20 pounds of more per ton of salt effective but caking sharply enhanced.
Water soluble complex iron cyanide _____ Effective down to about 20° F.

It will thus be evident that if calcium chloride is used as an anti-freezing agent, the caking tendency of the bulk particulate sodium chloride is amplified; if a water soluble complex iron cyanide is used, caking is inhibited but protection against freezing is limited to temperatures above about 20° F. However, we have found that combinations of an anionic surfactant with a water soluble complex iron cyanide, with calcium chloride, or with both when applied in minor amounts to bulk particulate sodium chloride act as powerful agents to inhibit both caking and freezing.

It will be obvious that a serious problem exists when salt containing even small amounts of moisture is exposed to temperatures at which freezing occurs. For example, at subfreezing temperatures particulate sodium chloride used for highway snow and ice removal becomes when wet so lumpy and/or solidified as to be virtually useless. Moreover, this problem may be rendered still more serious due to supercooling effects during transportation. Although the eutectic freezing point of sodium chloride brine is −6° F., the brine which exists in wet salt is completely saturated, and the solid phase which separates therefrom is sodium chloride dihydrate ($NaCl \cdot 2H_2O$) which forms at or below temperatures of 32.2° F. The dihydrate crystals bond the sodium chloride particles together in the phenomenon hereinabove referred to as "freezing."

It is, therefore, an object of this invention to provide an additive for particulate sodium chloride which is effective to inhibit freezing and consequent solidification of the salt even at very low ambient temperatures.

It is a further object of this invention to provide an additive as aforesaid in which the caking tendency of salt is also materially reduced so that one additive may be used to control both freezing and caking.

Another object of this invention is to provide an additive for salt which is economical in that only a relatively minor amount of the additive is needed to materially inhibit caking and/or freezing.

A further object of this invention resides in the provision of an additive, as aforesaid, which also displays the ability to lessen the tendency of brine formed from the treated salts to corrode or otherwise attacks metals.

In most cases, additives containing all components (i.e., anionic surfactant, calcium chloride and water soluble complex iron cyanide) display a greater degree of freezing temperature depression whereas additives containing the corresponding anionic surfactant and only one of either calcium chloride or water soluble complex iron cyanide are somewhat less effective (i.e., higher freezing temperature). However, the reverse is true in some cases; that is, additives containing the anionic surfactant with either calcium chloride or the complex iron cyanide alone may display the greatest anti-freezing effect, but in most such cases, it is the combination of anionic surfactant plus calcium chloride which is the most effective. However, the effect is significant in any case and the additive mixture to be used in any particular instance may be chosen in the light of economic and other considerations such as resistance to leaching, corrosion inhibiting and availability of materials etc., and the ambient temperatures which are likely to prevail. In this regard, as has been mentioned, the solid phase sodium chloride dihydrate forms in saturated sodium chloride brine at about 32.2° F., whereas the eutectic point of saturated sodium chloride brine is approximately —6° F. We have found that anionic surfactants, in general, when used in additive mixtures as hereinafter specified will materially depress the freezing of bulk particulate sodium chloride. Owing to the inevitable presence of impurities in sodium chloride as mined, particulate masses of such material will not display a tendency toward freezing at 32.2° F. as above specified but will, instead, commence freezing at a temperature within the range of about 25°–29° F. dependent upon the source and will, in any event, be reduced to intractable and useless masses at temperatures as high as 20° F. Although greater protection against freezing can be obtained by the addition of substantial amounts of calcium chloride, caking tendency is thereby materially increased or amplified and, as well, protection against freezing by the use of calcium chloride alone is costly due to the amount of calcium chloride required for this purpose. This can best be understood by the fact that calcium chloride is itself hygroscopic so that, when admixed with sodium chloride in small amounts (i.e., 5–10 pounds per ton as stated hereinbefore), the calcium chloride tends to "dry" the sodium chloride and to thus inhibit caking. When, however, quantities of calcium chloride are present in amount to inhibit freezing (at least about 20 pounds of calcium chloride per ton of sodium chloride), so much moisture becomes picked up that an increase in sodium chloride saturated brine occurs to the extent that caking increases. It is for this reason that piles of calcium chloride and sodium chloride which are to be used in admixture for highway snow and ice removal must remain separate until just prior to use.

Thus, it will be appreciated that despite the use of additives such as calcium chloride or a water soluble complex iron cyanide which might be used to inhibit caking, say during summer storage, bulk particulate sodium chloride is vulnerable to the separate phenomenon of freezing commencing at relatively high temperatures. For all practical purposes, the temperature of 20° F. is regarded as that which will cause bulk particulate sodium chloride, even though treated with additives, to be rendered useless unless subjected to forcible breakage. As a consequence, during winter, bulk particulate sodium chloride storage piles will require manual or machine breaking to overcome freezing effects whereas bulk particulate sodium chloride transported by truck or rail will require breaking if unloading and handling are to be expected.

Thus, it will be seen that temperatures of 25° F. and lower are critical insofar as the freezing of bulk particulate sodium chloride is concerned. We have found that anionic surfactants are in all cases usable, in additive mixtures as specified above, to inhibit freezing down to temperatures lower than 20° F. and, in most cases, to temperatures far below the eutectic point (—6° F.) of sodium chloride brine.

Specifically, it has been found that if an anionic surfactant in the amount of at least about .025 pounds per ton of sodium chloride is combined with calcium chloride in an amount of about 3–5 pounds per ton of sodium chloride or with a water soluble complex iron cyanide in an amount to provide about .13 to about .22 pound of ferrocyanide ion per ton of sodium chloride, or with both calcium chloride and a water soluble complex iron cyanide, both freezing and caking of the bulk particulate sodium chloride are inhibited to a significant degree.

The additives according to this invention may be grouped into two classes, I or II, according to the degree to which they inhibit freezing. Class I additives are effective to inhibit freezing of bulk particulate sodium chloride at temperatures below —10° F. while Class II additives are effective to inhibit caking within the temperature range of —10° F. and less than 20° F. The following table enumerates a large variety of commercially available surface active agents and the classes within which they fall when admixed, as above, with the other component or components listed in the heading.

TABLE I

| Surfactant | $CaCl_2$ | Iron cyanide | $CaCl_2$ and iron cyanide |
|---|---|---|---|
| Igepon series: | | | |
| AC-78 | I | II | *I |
| AP-78 | II | II | I |
| CN-42 | II | II | I |
| T-33 | I | II | *I |
| T-77 | I | II | I |
| TE-42 | *I | II | I |
| TK-32 | I | II | I |
| TN-74 | I | II | *I |
| Alipol series: | | | |
| CO-433 | II | I | I |
| EO-526 | II | I | I |
| CO-436 | I | *I | I |
| RC-335 | I | II | *I |
| Blancol | II | II | I |
| Nekal BA-75 | I | II | *I |
| Nekal WS-25 | I | II | *I |
| Sorapon SF-78 | I | II | *I |
| Gafac LO-529 | II | I | *I |
| Gafac RE-610 | I | *I | *I |
| Gafac RM-710 | II | II | I |
| Nopco 1186-A | *I | II | I |
| Nopco 2272-R | *I | II | I |
| Nopco 2031 | *I | II | I |
| Sellogen concentrate | *I | II | I |
| Aerosol OT 75 | I | I | II |
| Ultrawet K | *I | II | II |
| Sarkosyl O | II | II | II |
| Sarkosyl NL-30 | II | II | II |
| Victawet 58B | I | I | *I |
| Victawet 35B | I | I | *I |
| Benax 2A1 | II | II | II |
| Sul-Fon-Ate AA-9 | II | II | I |
| Sul-Fon-Ate AA-10 | II | II | II |
| Sul-Fon-Ate OA-5 | II | *I | I |

In the above table, it will be noted that there are many instances in which Class I anti-freezing protection is obtained by two or more of the three formulations noted. In such instances, where there is noticeably greater protection afforded by a particular formulation, an asterisk is noted to indicate this fact. However, the presence of an asterisk is not to be taken as an indication that the other formulations of a corresponding row may not be preferred. In this regard, it will be understood that, at presently prevailing prices, a formulation of surfactant plus sodium ferrocyanide decahydrate is somewhat less expensive than a formulation of the same surfactant plus calcium chloride, the three-component formulation necessarily being the most costly. When it is realized that many hundreds or even thousands of tons may be involved in a single stockpile, it can be appreciated that cost may constitute a controlling factor in the selection of a particular formulation.

The Igepon series of surfactants are available from General Aniline and Film Corporation, of New York, N.Y.; the Igepon A series having the general structure:

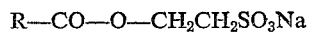

and the T and C series having the general structure:

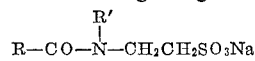

where R and R′ are fatty alkyl groups.

The Alipol series of surfactants are available from the same source. Alipol CO-433 and EO-526 are sodium salts of sulfated nonylphenoxypolyethenoxy ethenols; while Alipol CO-436 and RC-335 are ammonium salts of sulfated nonylphenoxypolyethenoxy ethanols. Blancol is available from the same source and is a sodium salt of sulfonated napthalene-formaldehyde condensate. Nekal BA-75 and WS-25 are available from the same source and are sodium alkylnaphthalene sulfonates. Sorapon SF-78 is available from the same source and is a sodium dodecylbenzene sulfonate. Gafac LO-529 and Gafac RE-610 and RM-710 are available from the same source and are sodium salts and free acids, respectively, of complex phosphate esters.

The Nopco series of surfactants are available from Nopco Chemical Company of Newark, N.J. Nopco 1186-A, 2272-R and 2031 are, respectively, sodium dioctyl sulfosuccinate, sulfate fatty ester, and sulfated fatty acid. Sellogen concentrate is available from the same source and is sodium methyloleoyl taurate.

Aerosol OT-75 is available from American Cyanamid Company of Wayne, N.J., and is sodium dioctyl sulfosuccinate.

Ultrawet K is an alkyl aryl sulfonate type of surfactant available from the Atlantic Refining Company of Philadelphia, Pa.

Sarkosyl O is an oleoyl sarcosine and Sarkosyl NL-30 is sodium lauryl sarcosinate available from Geigy Industrial Chemicals of Ardsley, N.Y.

Victawet 58B and Victawet 35B have the following respective structures:

$Na_5R_5(P_3O_{10})_2$ ———————————— R=capryl.
$Na_5R_5(P_3O_{10})_2$ ———————————— R=2-ethylhexyl.

and are available from Victer Chemical Division of Stauffer Chemicals, New York, N.Y.

Benax 2A1 is dodecylated oxydibenzene disulfonate available from The Dow Chemical Company of Midland, Mich.

The Sul-Fon-Ate series are alkyl aryl sulfonate surfactants available from the Tennessee Corporation of Atlanta, Ga.

In the additives of this invention, the anionic surfactant must be present in an amount of at least about .025 pounds per ton of sodium chloride (i.e. about 10 parts per million) whereas its upper limit is not critical, being dictated by practical considerations. However, in all of the formulations herein, the amount of anionic surfactant used does to some extent affect the degree of protection against freezing. That is, as the amount of anionic surfactant is increased from .025 pound per ton of sodium chloride, lowering of the freezing point will occur. However, the most marked results in this direction appear to occur within the range of .025 to about .1 pound of anionic surfactant per ton of sodium chloride, with further increase in the amount of anionic surfactant producing little, if any, lowering of the freezing temperature. Utilization of less than about .025 pound of anionic surfactant per ton of sodium chloride sharply degrades antifreezing performance. Thus, for these reasons and for the reason that substantial protection against freezing is desired as a general rule, it is preferred to use the anionic surfactant in the amount of at least about .1 pound per ton of sodium chloride.

Insofar as the calcium chloride is concerned, we have found that it must be added in such amount that at least about 3 pounds of calcium chloride per ton of sodium chloride is present when considering the amount of naturally occurring calcium chloride which may already be present in the sodium chloride as mined. Preferably, we use calcium chloride in an amount to represent, in the additive itself, about 3-4 pounds per ton of sodium chloride. As to an upper limit, about 5 pounds of additive calcium chloride per ton of sodium chloride appears to fit this definition since such amount will insure the presence of this component within the required range and no beneficial effect is achieved by exceeding this amount.

Insofar as the water soluble complex iron cyanide is concerned, its limits are about .13-.22 pound of ferrocyanide ion per ton of sodium chloride, the lower limit being dictated by degradation of freezing protection and the upper limit by cost considerations based upon the fact that no beneficial effects are achieved by exceeding this limit. Based upon sodium ferrocyanide decahydrate, this range of ferrocyanide ion content corresponds to .3 and .5 pound of this preferred water soluble complex iron cyanide per ton of sodium chloride. Another preferred water soluble complex iron cyanide is potassium ferrocyanide trihydrate. The preferred amount of ferrocyanide ion is about .17 pound per ton of sodium chloride.

Sight should not be lost of the anti-caking properties of the present invention, as distinguished and aside from the anti-freezing properties, for marked improvements are achieved in this direction also. To appreciate this, it must be borne in mind that for anti-caking, it requires a minimum of about .0085 pound of ferrocyanide ion per ton of sodium chloride to achieve this result, whereas formulations according to the present invention having about half this amount of ferrocyanide ion per ton of sodium chloride will achieve the same degree of anti-caking effect while, at the same time, being more resistant to leaching and being effective to achieve anti-corrosive effects. In general, the formulations of this invention may be reduced from the preferred amounts by a factor of about 40 to obtain anti-caking protection without anti-freezing protection.

The additives of this invention must be as thoroughly and uniformly admixed with the sodium chloride as is possible. To this end, dry mixing may be used but the spraying of aqueous solutions or dispersions of the additives is preferred.

As used herein, the term "anionic surfactant" means a synthetic anionic surface active agent, and "water soluble complex iron cyanide" means a complex iron cyanide which is water soluble in the classical sense, as exemplified by sodium ferrocyanide decahydrate and as distinguished from the essentially water insoluble complex iron cyanides.

Based upon one part anionic surfactant, the ranges of calcium chloride and ferrocyanide ion, respectively, are about 10/1-200/1 and about 5/1-9/1. Based upon the particulate sodium chloride and defined as parts per million parts of sodium chloride, the ranges are as follows:

|  | P.p.m. |
|---|---|
| Anionic surfactant | 12-125 |
| Calcium chloride | 1500-2500 |
| Ferrocyanide ion | 65-110 |

The above ranges apply to cases in which protection against both freezing and caking are desired. When caking alone is to be considered, the minimum amounts of the components, in parts per million parts of sodium chloride, are as follows:

|  | P.p.m. |
|---|---|
| Anionic surfactant | 1 |
| Calcium chloride | 40 |
| Ferrocyanide ion | 5 |

We claim:
1. An additive for inhibiting freezing and caking of particulate sodium chloride, consisting of:
   one part by weight of an anionic synthetic surface active agent,
   and about 10 to about 200 parts by weight of calcium chloride.

2. An additive for inhibiting freezing and caking of particulate sodium chloride, consisting of:
   one part by weight of an anionic synthetic surface active agent,
   a water soluble complex iron cyanide selected from the group consisting of alkali metal ferrocyanide salts and alkaline earth metal ferrocyanide salts in amount sufficient to provide ferrocyanide ion in an amount of about 0.5 to about 9.0 parts by weight,
   and about 10 to about 200 parts by weight of calcium chloride.

3. Conditioned sodium chloride particles resistant to freezing and caking, comprising sodium chloride particles having at least a partial coating of a composition consisting of:
- (a) an anionic synthetic surface active agent, and
- (b) calcium chloride,
    in which the calcium chloride is present in an amount of about 10 to about 200 times the quantity of the water soluble synthetic detergent and is at least about 3 pounds per ton of sodium chloride, and the anionic synthetic surface active agent is present in an amount at least about 10 parts per million parts of the sodium chloride by weight.

4. Conditioned sodium chloride particles resistant to freezing and caking, comprising sodium chloride particles having at least a partial coating of a composition consisting of:
- (a) an anionic synthetic surface active agent
- (b) calcium chloride, and
- (c) a water soluble complex iron cyanide selected from the group consisting of alkali metal ferrocyanide salts and alkaline earth metal ferrocyanide salts
    in which the calcium chloride is present in an amount of about 10 to about 200 times the quantity of the water soluble synthetic detergent and is at least about 3 pounds per ton of sodium chloride, the water soluble complex iron cyanide is present in an amount sufficient to provide ferrocyanide ion in amount of about .5 to about 9 times the quantity of anionic surface active agent and at least about .13 pound per ton of sodium chloride, and the anionic synthetic surface active agent is present in an amount at least about 10 parts per million of the sodium chloride by weight.

5. The process of inhibiting the freezing and caking of granular sodium chloride which comprises:
    applying an additive consisting essentially of an anionic synthetic surface active agent and calcium chloride to the granular sodium chloride in minor amount sufficient to at least partially coat the granular sodium chloride and inhibit freezing and caking tendencies thereof.

References Cited

UNITED STATES PATENTS

| | | | |
|---|---|---|---|
| 2,104,619 | 1/1938 | Lehmann | 252—385 |
| 3,090,756 | 5/1963 | Kaufmann | 252—70 |

LEON D. ROSDOL, *Primary Examiner.*

JULIUS GREENWALD, *Examiner.*

J. D. WELSH, S. D. SCHWARTZ, *Assistant Examiners.*